(12) United States Patent
Vis

(10) Patent No.: US 7,012,772 B1
(45) Date of Patent: Mar. 14, 2006

(54) SAMPLED AMPLITUDE READ CHANNEL EMPLOYING AN ADAPTIVE NON-LINEAR CORRECTION CIRCUIT FOR CORRECTING NON-LINEAR DISTORTIONS IN A READ SIGNAL

(75) Inventor: Marvin L. Vis, Longmont, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/145,524

(22) Filed: Sep. 2, 1998

(51) Int. Cl.
G11B 5/09 (2006.01)

(52) U.S. Cl. .............................. 360/46; 360/65; 375/232
(58) Field of Classification Search ................... 360/65, 360/46, 45; 375/229, 230, 232, 233
See application file for complete search history.

(56) References Cited

U.S. PATENT DOCUMENTS

| | | | |
|---|---|---|---|
| 5,132,988 A | * 7/1992 | Fisher et al. | ................. 375/233 |
| 5,283,521 A | 2/1994 | Ottesen et al. | |
| 5,418,660 A | 5/1995 | Sato et al. | |
| 5,744,969 A | * 4/1998 | Grochowski et al. | ....... 324/614 |
| 5,744,993 A | 4/1998 | Sonntag | |
| 5,790,335 A | 8/1998 | Sugawara et al. | |
| 5,872,668 A | 2/1999 | Muto | |
| 5,903,857 A | * 5/1999 | Behrens et al. | ........... 360/65 X |
| 5,917,855 A | * 6/1999 | Kim | ........................... 375/229 |
| 5,999,355 A | * 12/1999 | Behrens et al. | ................ 360/65 |

OTHER PUBLICATIONS

Dean Palmer et al., "Characterization of the Read/Write Process for Magnetic Recording", *IEEE Transactions on Magnetics*, vol. 31, No. 2, Mar. 1995.

B. Wilson and S. Wang, "Generalized Method for Measuring Read–Back Nonlinearity Using a Spin Stand", *Journal of Applied Physics*, 81(8), Apr. 15, 1997.

D. Palmer and P. Ziperovich, "Identification of Nonlinear Write Effects Using Psuedorandom Sequences", *IEEE Transactions on Magnetics*, vol. Mag–23, No. 5, Sep. 1987.

J.W.M. Bergmans et al., "Dual–DFE Read/Write Channel IC for Hard–Disk Drives", *IEEE Transactions on Magnetics*, vol. 34, No. 1, Jan. 1998.

Peter M. Clarkson, *OPtimal and Adaptive Signal Processing*, chapter 6.2.10 "LMS Volterra Filter", pp. 301–307, CRC Press, Inc., 1993.

* cited by examiner

*Primary Examiner*—Alan Faber

(57) ABSTRACT

A sampled amplitude read channel is disclosed for magnetic disk storage systems comprising an adaptive non-linear correction circuit for correcting non-linear distortions in the read signal, such as asymmetry caused by the non-linear response of a magneto-resistive (MR) read head. The analog read signal is sampled and the discrete time sample values equalized into a desired partial response prior to sequence detection. The non-linear correction circuit is inserted into the read path prior to the sequence detector and adaptively tuned by a least-mean-square (LMS) adaptation circuit. In one embodiment, the non-linear correction circuit is a discrete-time Volterra filter comprising a linear response for implementing an equalizing filter, and a non-linear response for attenuating non-linear distortions in the read signal. The filter coefficients of both the linear and non-linear sections of the Volterra filter are adaptively adjusted by the LMS adaptation circuit. In an alternative embodiment, the non-linear correction circuit operates in the analog domain, prior to the sampling device, where the cost and complexity can be minimized. The analog correction circuit implements an inverse response to that of the non-linearity in the read signal, and the response is adaptively tuned using an LMS update value computed in discrete-time for a Volterra filter, without actually implementing a Volterra filter. Further, the LMS update value for the analog correction circuit can be implemented using a simple squaring circuit.

26 Claims, 9 Drawing Sheets

SAMPLED AMPLITUDE READ CHANNEL EMPLOYING AN ADAPTIVE NON-LINEAR CORRECTION CIRCUIT FOR CORRECTING NON-LINEAR DISTORTIONS IN A READ SIGNAL

CROSS REFERENCE TO RELATED APPLICATIONS AND PATENTS

This application is related to another U.S. patent application, namely U.S. Pat. No. 5,999,355 entitled "GAIN AND PHASE CONSTRAINED ADAPTIVE EQUALIZING FILTER IN A SAMPLED AMPLITUDE READ CHANNEL FOR MAGNETIC RECORDING." This application is also related to several U.S. patents, namely U.S. Pat. No. 5,291,499 entitled "METHOD AND APPARATUS FOR REDUCED-COMPLEXITY VITERBI-TYPE SEQUENCE DETECTORS," U.S. Pat. No. 5,696,639 entitled "SAMPLED AMPLITUDE READ CHANNEL EMPLOYING INTERPOLATED TIMING RECOVERY," U.S. Pat. No. 5,424,881 entitled "SYNCHRONOUS READ CHANNEL," and U.S. Pat. No. 5,585,975, "EQUALIZATION FOR SAMPLE VALUE ESTIMATION AND SEQUENCE DETECTION IN A SAMPLED AMPLITUDE READ CHANNEL." All of the above-named and patents are assigned to the same entity, and all are incorporated herein by reference.

FIELD OF INVENTION

The present invention relates to the recording and reproduction of binary data in magnetic disk storage systems for digital computers, particularly to a sampled amplitude read channel employing an adaptive non-linear correction circuit for correcting non-linear distortions in the read signal, such as asymmetries caused by the non-linear response of a magneto-resistive (MR) read head.

BACKGROUND OF THE INVENTION

In magnetic disk drive storage devices, sampled amplitude read channels employing partial response (PR) signaling with maximum likelihood (ML) sequence detection have provided a substantial increase in storage capacity by enabling significantly higher linear bit densities. Partial response signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without sacrificing performance in terms of signal-to-noise ratio (SNR).

Partial response channels are characterized by the polynomials $(1-D)(1+D)^n$ where D represents a delay of one symbol period and n is an integer. For n=1,2,3, the partial response channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses. The dipulse response for a PR4 channel $(1-D^2)$ is shown as a solid line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

It should be apparent that the linear combination of time shifted PR4 dipulse responses will result in a channel output of +2, 0, or −2 at the symbol instances (with the dipulse samples normalized to +1, 0, −1) depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples.

The performance of the trellis sequence detector in terms of bit error rate depends on the amount of noise in the system, including noise due to the spectrum of the read signal diverging from the ideal partial response. Linear distortions in the read signal can generally be suppressed using a linear equalizer which may operate on the continous-time analog read signal or the discrete-time samples of the read signal. Typical read channels employ both an analog equalizer, such as a biquad analog filter, followed by a nth order finite-impulse response (FIR) discrete-time filter. Linear equalizers, however, are not effective in attenuating non-linear distortions in the read signal, such as asymmetries caused by the non-linear response of a magneto-resistive (MR) read head.

An MR read head comprises an MR sensor element with a resistance which is proportional to the strength of the magnetic flux; the read signal is generated by applying a current to the MR element and measuring the voltage across it as it passes over the magnetic transitions recorded on the disk. FIG. 2A is a plot of the head's resistance versus the magnetic flux which illustrates that the response can be very non-linear. The asymmetry effect of this non-linearity on the read signal is illustrated in FIG. 2B which shows the head's response to an isolated positive and negative magnetic transition. In this example, the magnitude of the pulse induced by the positive magnetic transition is greater than the magnitude of the pulse induced by the negative magnetic transition (note that the asymmetry in the pulses may be reversed, and other asymmetries may also be present in the read signal). Ultimately, the non-linear distortions prevent the read signal from attaining the desired partial response target, introducing noise into the sample values which degrades the performance of the trellis sequence detector. This undesirable effect is generally ameliorated by applying a magnetic biasing field across the MR element so that it operates in a linear region of the response while still providing sufficient sensitivity and stability. However, biasing the MR element does not remove the non-linear aberrations from the read signal entirely, particularly when errors in the biasing field move the MR element away from the optimal linear region of operation.

There is, therefore, a need for an improved sampled amplitude read channel for use in disk storage systems that provides a non-linear correction circuit for correcting non-linear distortions in the read signal, such as asymmetries caused by the non-linear response of an MR read head.

SUMMARY OF THE INVENTION

A sampled amplitude read channel is disclosed for magnetic disk storage systems comprising an adaptive non-linear correction circuit for correcting non-linear distortions in the read signal, such as asymmetry caused by the non-linear response of a magneto-resistive (MR) read head. The analog read signal is sampled and the discrete time sample values equalized into a desired partial response prior to sequence detection. The non-linear correction circuit is inserted into the read path prior to the sequence detector and adaptively tuned by a least-mean-square (LMS) adaptation circuit. In one embodiment, the non-linear correction circuit is a discrete-time Volterra filter comprising a linear response for implementing an equalizing filter, and a non-linear response for attenuating non-linear distortions in the read signal. The filter coefficients of both the linear and non-linear sections of the Volterra filter are adaptively adjusted by the LMS adaptation circuit. In an alternative embodiment, the non-linear correction circuit operates in the analog domain, prior to the sampling device, where the cost and complexity can be minimized. The analog correction circuit implements an inverse response to that of the non-linearity in the read signal, and the response is adaptively tuned using an LMS update value computed in discrete-time for a Volterra filter, without actually implementing a Volterra filter. Further, the LMS update value for the analog correction circuit can be implemented using a simple squaring circuit.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Overview

Figure 1A:
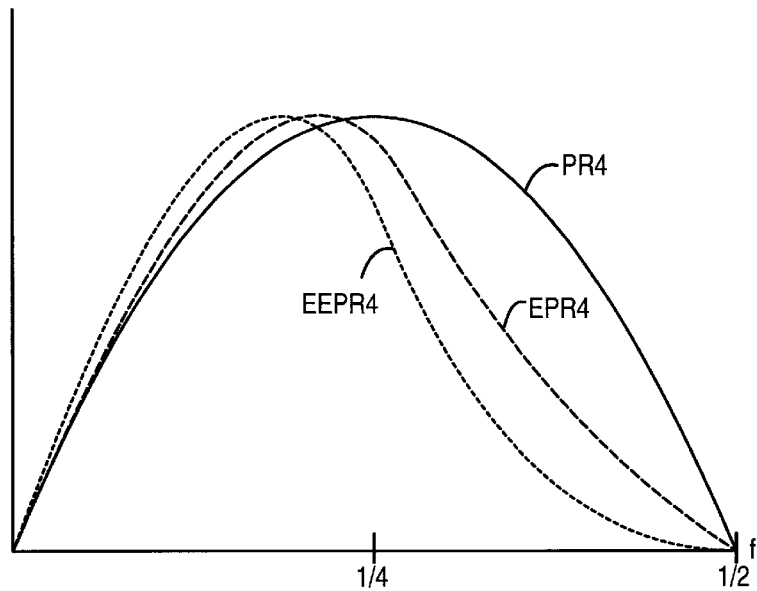
FIG. 1A shows the frequency response for a PR4, EPR4 and EEPR4 read channel.
Figure 1B:
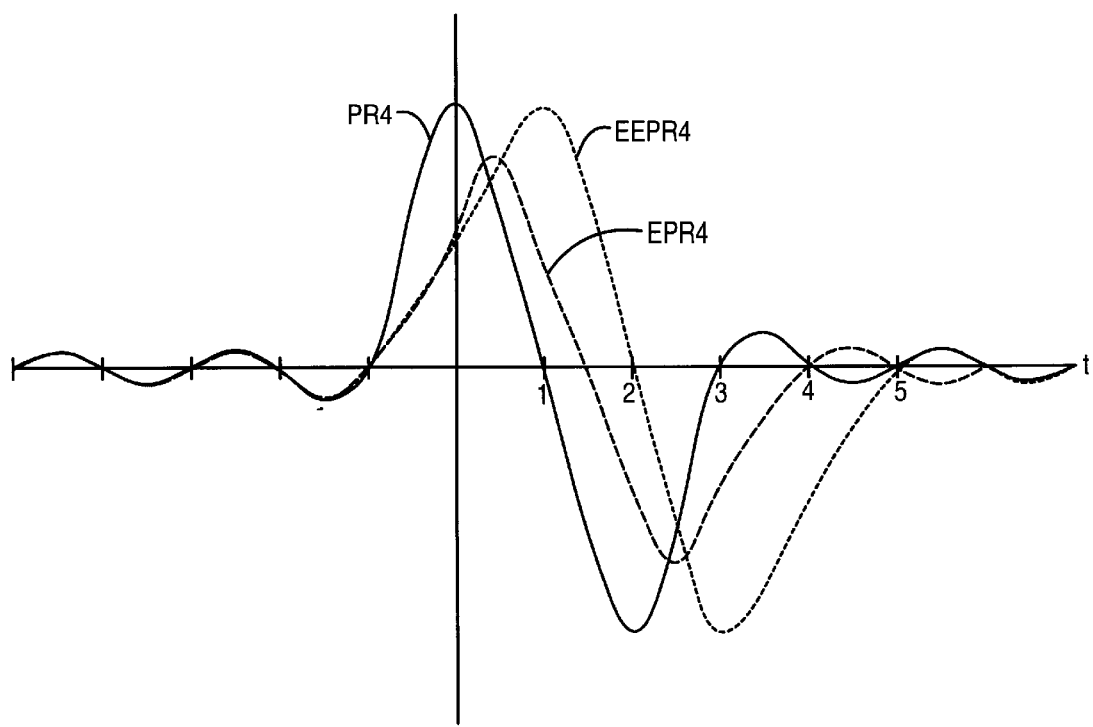
FIG. 1B shows the dipulse responses for the PR4, EPR4 and EEPR4 read channels of FIG. 1A.
Figure 2A:
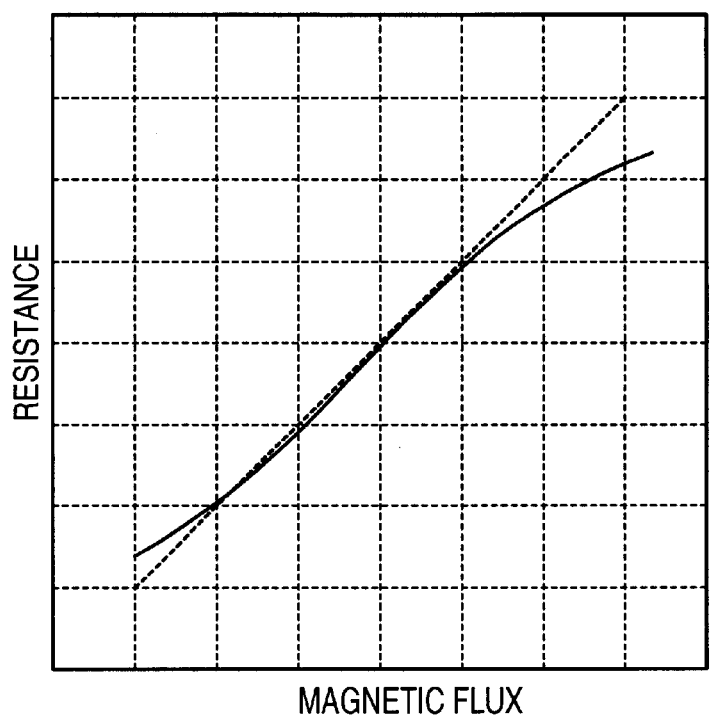
FIG. 2A is a plot of the resistance of an MR read head versus magnetic flux.
Figure 2B:
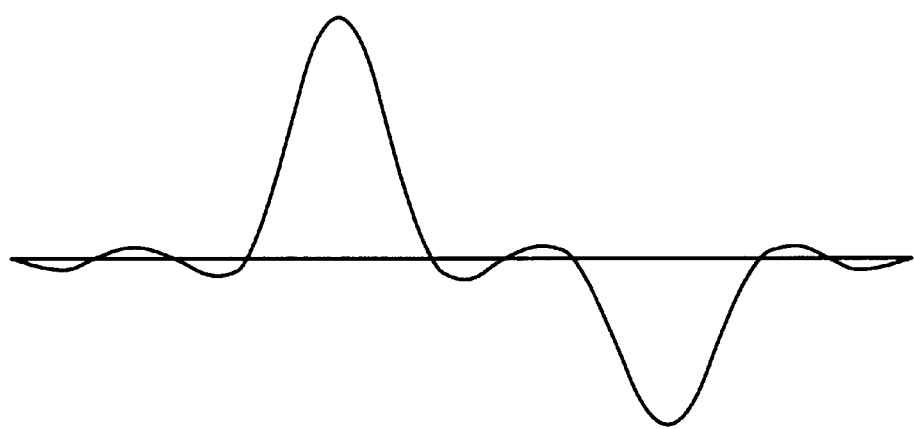
FIG. 2B illustrates the asymmetry introduced into the read signal from the non-linear response of the MR read head.
Figures 3, 4:
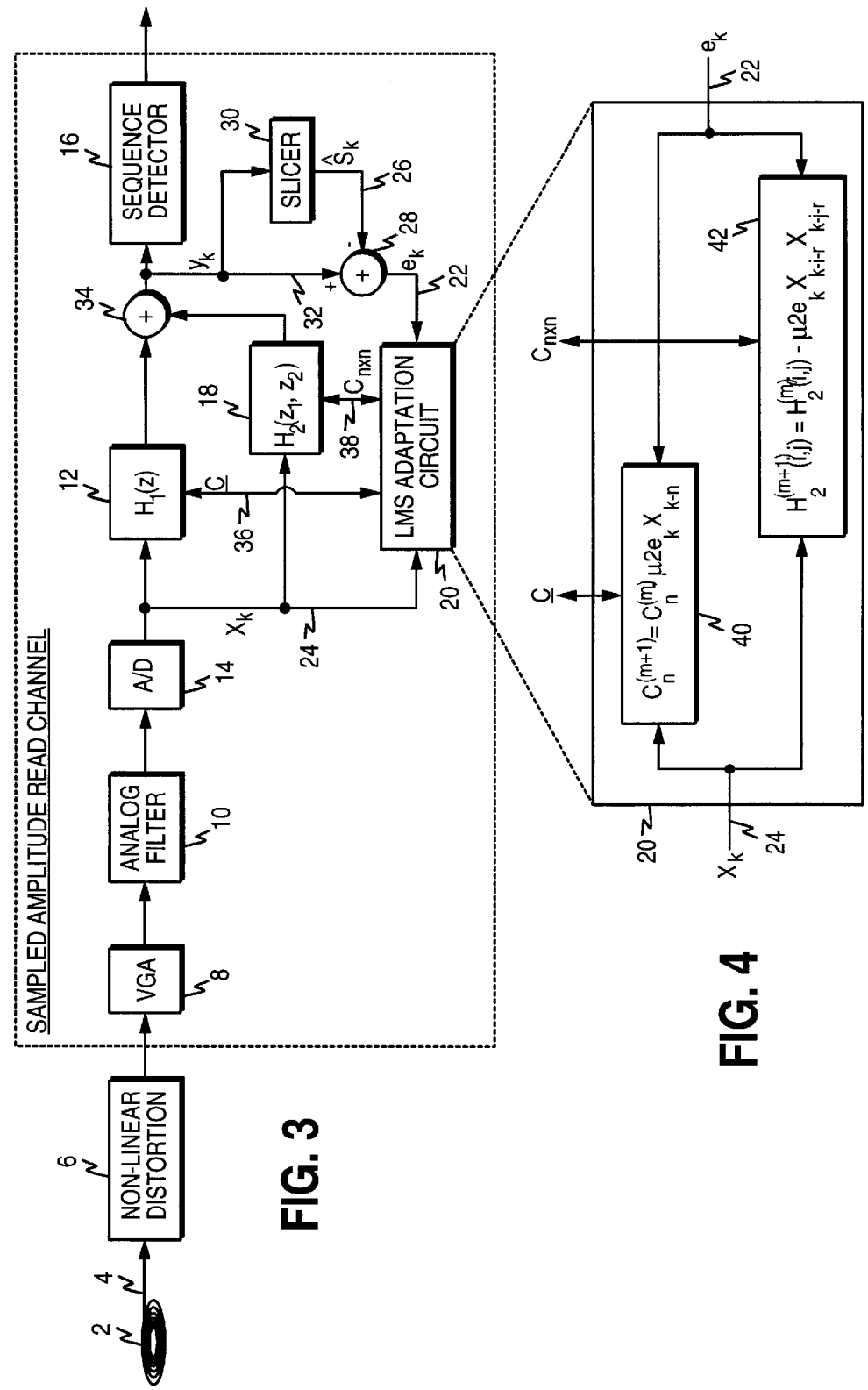
FIG. 3 is a block diagram of the sampled amplitude read channel of the present invention comprising a non-linear correction circuit implemented in discrete-time as an adaptive Volterra filter updated according to an LMS algorithm.
FIG. 4 shows details of the LMS adaptation circuit for the Volterra filter of FIG. 3.

The sampled amplitude read channel of the present invention is intended to operate within a magnetic disk storage device as illustrated in FIG. 3. A magnetic disk 2 comprising a plurality of concentric, radially spaced data tracks is rotated under a read head (e.g., an MR read head) which transduces the magnetic transitions recorded on the disk into an analog read signal 4 comprising polarity alternating pulses. A non-linear distortion 6 is introduced into the read signal 4, such as asymmetry distortion in the pulses caused by the non-linear response of an MR read head. The read channel includes circuitry for equalizing the read signal into a desired partial response, including a variable gain amplifier (VGA) 8, an analog filter 10, and an adaptive linear discrete-time equalizer 12. Since the linear equalizer 12 cannot compensate for non-linear distortions in the read signal, the read channel further comprises an adaptive non-linear correction circuit. The non-linear correction circuit is adapted to compensate for variations in the non-linear distortions that occur over time due to variations in fly-height, radial location of the head, temperature fluctuations, and other parameter variations in the system. After equalizing the read signal according to the desired partial response and attenuating the non-linear distortions, the sample values of the analog read signal are demodulated by a trellis sequence detector 16 which computes an estimated binary sequence most likely to have generated the read signal samples.

A least-mean-square (LMS) algorithm implements the adaptation strategy for the non-linear correction circuit. In a first embodiment, the non-linear correction circuit is implemented as a nth order discrete-time Volterra filter with coefficients updated according to an estimated stochastic gradient. In an alternative embodiment, the non-linear correction circuit is implemented in the analog domain wherein the cost and complexity of the design can be significantly reduced. The analog correction circuit comprises a simple second order response of the form $$x + \alpha x^2$$

which estimates the inverse response of the second order non-linearity caused by an MR read head. The LMS update for the coefficient $\alpha$ is estimated using the stochastic gradient computed for the center coefficient in the quadratic component of a Volterra filter, without actually implementing a Volterra filter.

Discrete-Time Volterra Filter

In the embodiment of the present invention shown in FIG. 3, the non-linear correction circuit is implemented as a discrete-time, adaptive Volterra filter which operates on the sample values of the read signal at the output of the sampling device 14. The Volterra filter comprises a linear component $H_1(z)$ 12 for performing the equalizing function in the read channel, and at least one higher order component (a second order component $H_2(z_1, z_2)$ 18 shown in FIG. 3) for attenuating a non-linear distortion in the read signal, such as asymmetry caused by the non-linear response of an MR read head. The output of the linear component $H_1(z)$ 12 is combined with the output of the non-linear component $H_2(z_1, z_2)$ 18 at adder 34 to generate the equalized, linearized signal samples 32 processed by the discrete-time sequence detector 16.

The linear component $H_1(z)$ 12 of the Volterra filter is implemented as a conventional finite-impulse-response (FIR) filter comprising a vector of coefficients $\underline{C}$ 36, and the non-linear second order component $H_2(z_1,z_2)$ 18 is implemented as an nxn matrix of coefficients $C_{nxn}$ 38. The output $y_k$ 32 of the Volterra filter can be written as $$y_k = \underline{C}^T \underline{X}_k + \underline{X}_k^T C_{nxn} \underline{X}_k$$

where $\underline{X}_k$ is a vector of the input sample values 24. The coefficients for both the linear component $H_1(z)$ 12 and the non-linear component $H_2(z_1,z_2)$ 18 are updated by a least-mean-square (LMS) adaptation circuit 20 which adjusts the coefficients $\underline{C}$ 36 and $C_{nxn}$ 38 in a manner that minimizes the squared error $e_k$ 22 computed as the difference 28 between the sample values $y_k$ 32 output by the Volterra filter and estimated ideal sample values $\hat{S}_k$ 26 corresponding to the desired partial response. A simple slicer circuit 30 generates the estimated ideal sample values $\hat{S}_k$ 26 by comparing the output samples of the Volterra filter 32 to thresholds which represent the decision boundaries for the ideal partial response signal samples.

The LMS adaptation circuit 20 approximates a minimum mean-square-error (MMSE) algorithm which minimizes an expected squared error function $$V(H_1,H_2) = E[(y_k - \hat{S}_k)^2].$$

The gradient of V with respect to $C_n$ (the nth coefficient in the linear filter $H_1(z)$ 12) is $$\frac{\partial V}{\partial C_n} = E\left[2(y_k - \hat{S}_k)\frac{\partial \hat{y}_k}{\partial C_n}\right] = 2E[e_k X_{k-n}]$$

where $e_k$ is the error value $y_k - \hat{S}_k$. The LMS algorithm, otherwise known as the stochastic gradient algorithm, updates the coefficient $C_n$ by removing the expectation operator E from the above gradient equation and following the residual gradient estimate to the minimum of V $$C_n^{(m+1)} = C_n^{(m)} - \mu 2 e_k X_{k-n}.$$

A similar computation leads to the LMS update algorithm for the non-linear second order component $H_2(z_1,z_2)$ 18 of the Volterra filter. The MMSE stochastic gradient equation for $H_2(z_1,z_2)$ 18 is $$\frac{\partial V}{\partial H_2(i,j)} = E\left[2e_k \frac{\partial \hat{y}_k}{\partial H_2(i,j)}\right] = E[2e_k X_{k-i} X_{k-j}]$$

which leads to an LMS stochastic gradient equation of $$H_2^{(m+1)}(i,j) = H_2^{(m)}(i,j) - \mu 2 e_k X_{k-i} X_{k-j}.$$

The circuitry for implementing the LMS adaptation circuit 20 for the Volterra filter of FIG. 3 is shown in FIG. 4. The discrete-time sample values $X_k$ 24 of the read signal and the error signal $e_k$ 22 are input into a first stochastic gradient circuit 40 for implementing the above LMS equation for the linear component $H_1(z)$ 12 (the additional r index shown in the figure accounts for the delay introduced by $H_1(z)$), and a second stochastic gradient circuit 42 for implementing the above LMS equation for the non-linear second order component $H_2(z_1,z_2)$ 18. At every sample interval, the previous coefficients $\underline{C}$ and $C_{nxn}$ are loaded into the LMS update circuits 40 and 42, updated coefficients are computed, and the updated coefficients restored to the filters for use in generating the next output sample $y_k$ 32. Alternatively, the LMS update operation can be decimated to reduce the number of multiplications and additions required at the cost of reducing the convergence speed. For details concerning a decimated implementation for an LMS adaptation strategy, see the above referenced U.S. patent entitled "GAIN AND PHASE CONSTRAINED ADAPTIVE EQUALIZING FILTER IN A SAMPLED AMPLITUDE READ CHANNEL FOR MAGNETIC RECORDING."

The non-linear second order component $H_2(z_1,z_2)$ 18 of the Volterra filter may be overly complex and expensive to implement depending on the design constraints for a particular storage system. For example, a second order component $H_2$ comprising a 5×5 matrix of coefficients requires 20 multiplies and 14 accumulates for every update. Therefore, the present invention provides an alternative embodiment which significantly reduces the cost and complexity by implementing the non-linear correction circuit in the analog domain, while still performing the LMS update procedure in discrete-time using the LMS update for a Volterra filter, without actually implementing the more complex Volterra filter. This embodiment of the present invention is discussed in detail in the following section.

Analog Non-Linear Correction Circuit

Figures 5, 6:
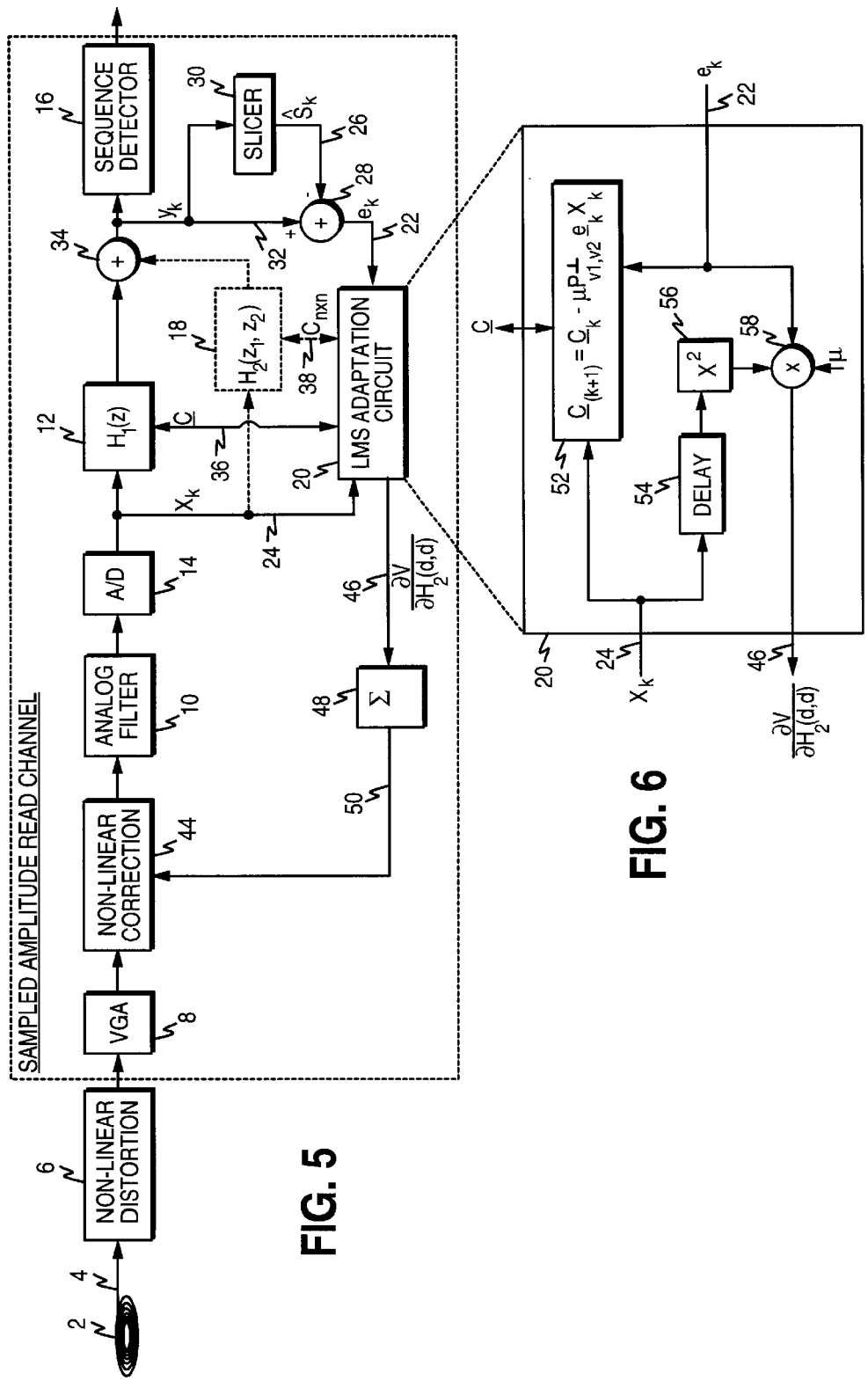
FIG. 5 is a block diagram of the sampled amplitude read channel of the present invention comprising a non-linear correction circuit implemented in the analog domain and updated using a stochastic gradient estimate generated from the LMS adaptation circuit for updating a discrete-time Volterra filter.
FIG. 6 shows further details of the LMS adaptation circuit for updating the linear equalizer and the analog correction circuit, including an orthogonal projection operation for constraining the phase delay and gain of the linear equalizer.

Details of the sampled amplitude read channel of the present invention employing an analog non-linear correction circuit are shown in FIG. 5. The elements shown are essentially the same as in FIG. 3 described above, except for the addition of an analog non-linear correction circuit 44 and the deletion of the second order component $H_2(z_1,z_2)$ 18 of the Volterra filter. The analog non-linear correction circuit 44 is adaptively tuned by the LMS adaptation circuit 20 using the stochastic gradient update computed for the second order component $H_2(z_1,z_2)$ 18 of the Volterra filter.

As with the linear component $H_1(z)$ 12 of the Volterra equalizer, the MMSE for the coefficients of the second order component $H_2(z_1,z_2)$ 18 is a function of the analog filter 10, the recording density, and noise spectrum and distribution, in addition to the non-linear distortion caused by MR asymmetry. However, the "center" coefficient of the nxn second order component $H_2(z_1,z_2)$ 18, defined as the center coefficient $H_2(d,d)$ on the diagonal of the nxn matrix, is a consistent indicator of the second order asymmetry distortion caused by the MR read head. If the center coefficient $H_2(d,d)$ is positive, it means that the Volterra equalizer needs to add a portion of $X^2_{k-d}$ to $\hat{S}_k$ when the MR asymmetry is under-corrected. Conversely, if the center coefficient $H_2(d,d)$ is negative, it means that the Volterra equalizer needs to subtract a portion of $X^2_{k-d}$ from $\hat{S}_k$ when the MR asymmetry is over-corrected. Therefore, the stochastic gradient update for the center coefficient $H_2(d,d)$ can be integrated and the integral representing the MR asymmetry error can be used to update the non-linear correction circuit 44. From the above LMS equation, the stochastic gradient update 46 shown in FIG. 5 for the center coefficient $H_2(d,d)$ is computed as $$\frac{\partial V}{\partial H_2(d,d)} = \mu 2 e_k X^2_{k-d}$$

The stochastic gradient update 46 is then integrated by a discrete-time accumulator 48, and the integral 50 used to adaptively tune the analog non-linear correction circuit 44.

Details of the LMS adaptation circuit 20 of FIG. 5 are shown in FIG. 6. The discrete-time sample values $X_k$ 24 of the read signal and the error signal $e_k$ 22 are input into a constrained stochastic gradient circuit 52 for implementing the above LMS equation for the linear component $H_1(z)$ 12 (i.e., the linear equalizer). As explained in greater detail below, the phase response of the linear equalizer $H_1(z)$ 12 is constrained using an orthogonal projection operation $Pv_1v_2^{\perp}$ so that the stochastic gradient update for the center coefficient $H_2(d,d)$ can be accurately computed relative to the equalizer's group delay. The discrete-time signal samples $X_k$ 24 are passed through a delay element 54 to generate the sample value $X_{k-d}$. The delayed sample value $X_{k-d}$ is then squared 56, and the squared sample value $X^2_{k-d}$ multiplied 58 by the error signal $e_k$ 22 and a gain value $\mu$ to implement the above equation $$\frac{\partial V}{\partial H_2(d,d)} = \mu 2 e_k X^2_{k-d}$$

The analog correction circuit 44 is designed to approximate the inverse response of the non-linearity in the read signal, thereby cancelling the non-linear distortion. Since the non-linear response of an MR read head is dominated by a second order component, the inverse response $f^{-1}(x)$ can be approximated as a second order polynomial of the form $$f^{-1}(x) = x + \alpha x^2.$$

The above inverse response is considered "two-sided" since it will add a second order compensation factor into both the positive and negative pulses in the read signal. However, the non-linearity may be biased toward distorting only the positive or negative pulses, in which case it may be better to employ a "one-sided" inverse response of the form:

$$f^{-1}(x) = \begin{cases} x & x \geq 0 \\ x + \alpha x^2 & x < 0 \end{cases} \text{ or }$$

$$f^{-1}(x) = \begin{cases} x + \alpha x^2 & x \geq 0 \\ x & x < 0 \end{cases}$$

depending on whether the distortion affects the negative or positive pulses, respectively. The coefficient $\alpha$ is adaptively tuned using the integrated stochastic gradient 50 for the center coefficient in the second order factor of the Volterra filter, as described above, in order to minimize the deviation (the error $e_k$ 22) of the read signal's response from the desired partial response.

Figure 7A:
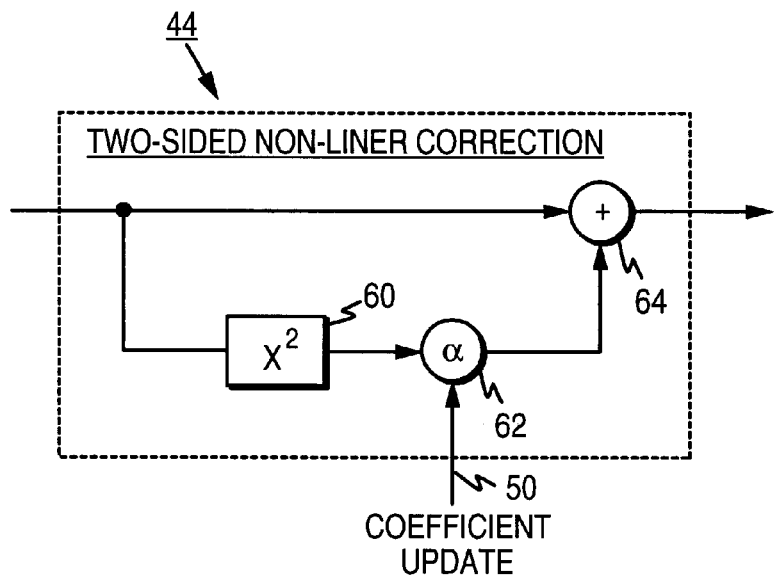
FIG. 7A shows details of a two-sided non-linear correction circuit implemented in the analog domain.
Figure 7B:
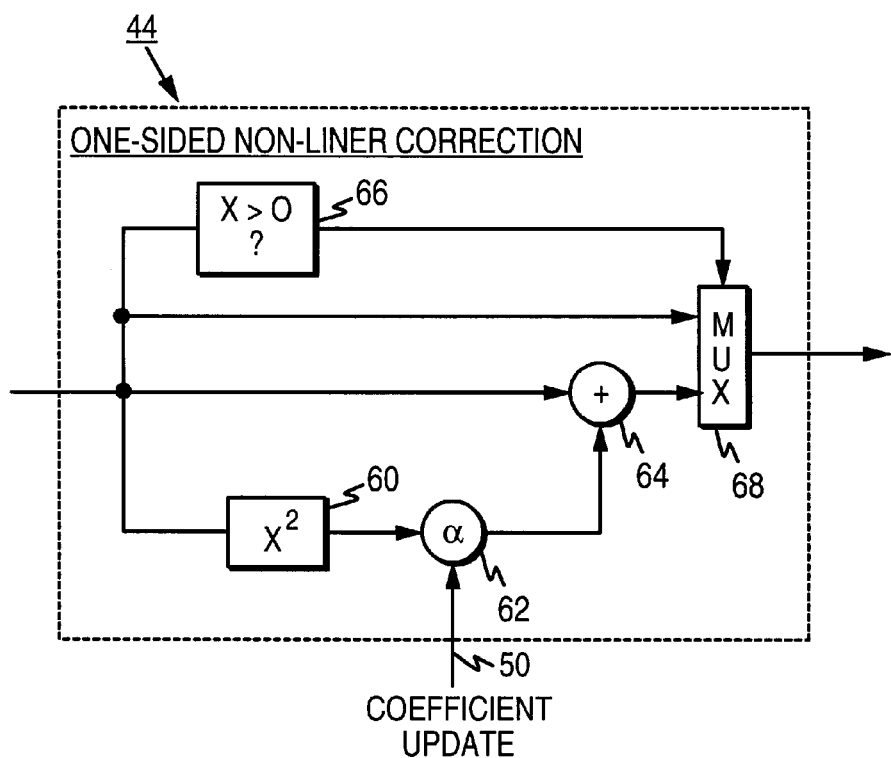
FIG. 7B shows details of a one-sided non-linear correction circuit implemented in the analog domain.

The circuitry for implementing the one-sided inverse response is shown in FIG. 7A. The analog read signal 61 output by the VGA 8 is squared by analog squarer 60, and the squared signal is then scaled by the coefficient $\alpha$ 62 which is adaptively tuned by the integrated stochastic gradient 50 generated by the LMS adaptation circuit 20 of FIG. 6. The scaled, squared read signal is then added to itself at adder 64 to implement the above two-sided inverse response. The circuitry for implementing the one-sided inverse response is shown in FIG. 7B, which is essentially the same as that of FIG. 7A except for the addition of a comparator for comparing the analog read signal to zero at comparator 66. The result of the comparison is used as the control signal to multiplexer 68 for selecting either the unmodified analog read signal, or the analog read signal after second order compensation, as the output of the non-linear correction circuit.

The stochastic gradient estimate for the center coefficient $H_2(d,d)$ of the Volterra filter will be an accurate estimate of the stochastic gradient for the analog non-linear correction circuit 44 only if the linear equalizer $H_1(z)$ 12 has a known, fixed (preferably integer) delay and is close to linear phase, giving it a nearly constant group delay across frequencies. Otherwise, there will be an unkown, fractional time delay between the read signal sample $X_k$ 24 and the error signal $e_k$ 22 making it more difficult or impossible to synchronize the error signal $e_k$ 22 to the appropriate signal sample $X_k$ 24. Thus, an aspect of the present invention is to implement the linear equalizer $H_1(z)$ 12 to have a fixed, integer group delay.

Figure 9:
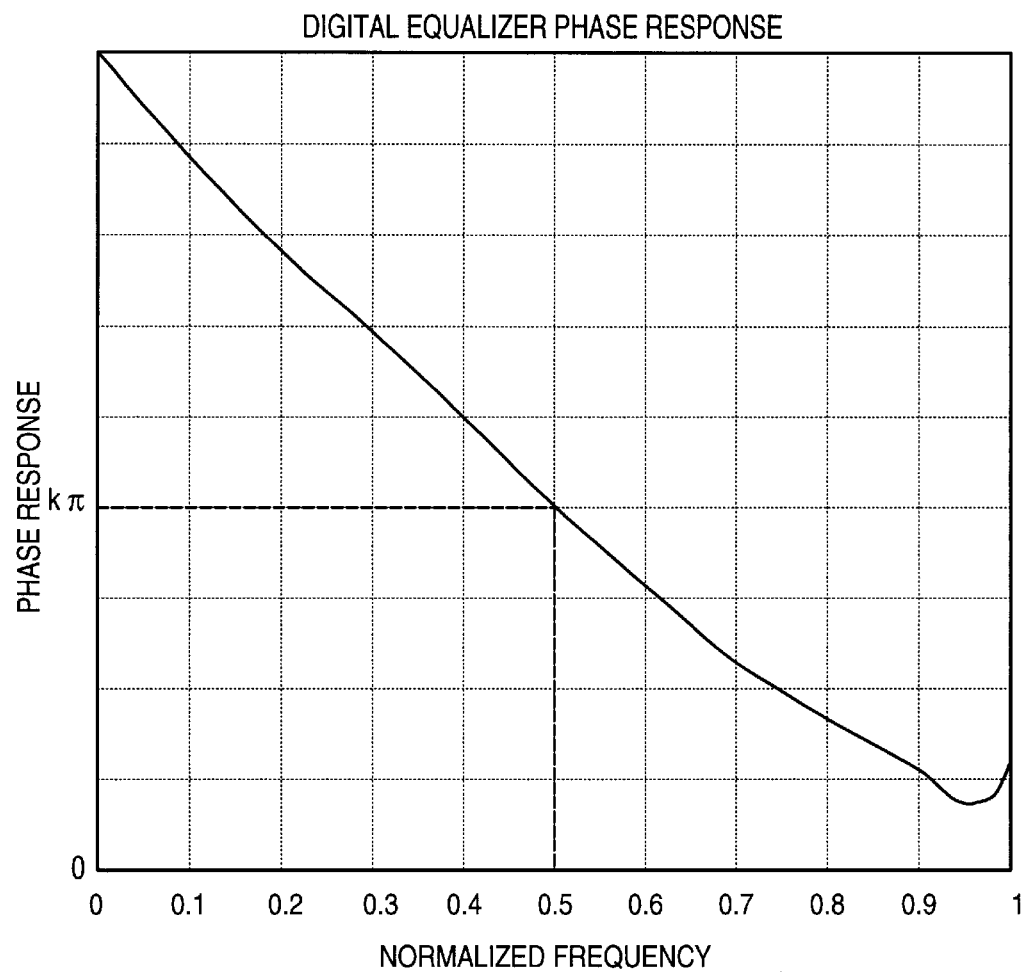
FIG. 9 shows the phase response of the linear equalizer of FIG. 6 constrained to $k\pi$ at the normalized frequency of 1/4T.

In the present invention the LMS update algorithm is modified to including an orthogonal projection operator $Pv_1v_2^\perp$, as seen in the LMS adaptation circuit of FIG. 6, which constrains the phase response of the linear equalizer at the preamble frequency of 1/4T, thereby fixing the phasy delay at 1/4T to an integer delay. Since the group delay of the linear filter is characteristically constant across a significant portion of the frequency spectrum as shown in FIG. 9, the orthogonal projection operator $Pv_1v_2^\perp$ effectively constrains the linear filter such that it exhibits a known, integer group delay with little variation across frequencies. Consequently, the equalized error signal $e_k$ 22 can be easily synchronized to the read signal samples $X_k$ 24 for computing the stochastic gradient estimate for the center coefficient $H_2(d,d)$. The gain of the linear equalizer $H_1(z)$ 12 is also constrained at the preamble frequency in order to attenuate interference from the timing recovery and gain control feedback loops which may prevent the LMS adaptation circuit from converging.

Figure 8:
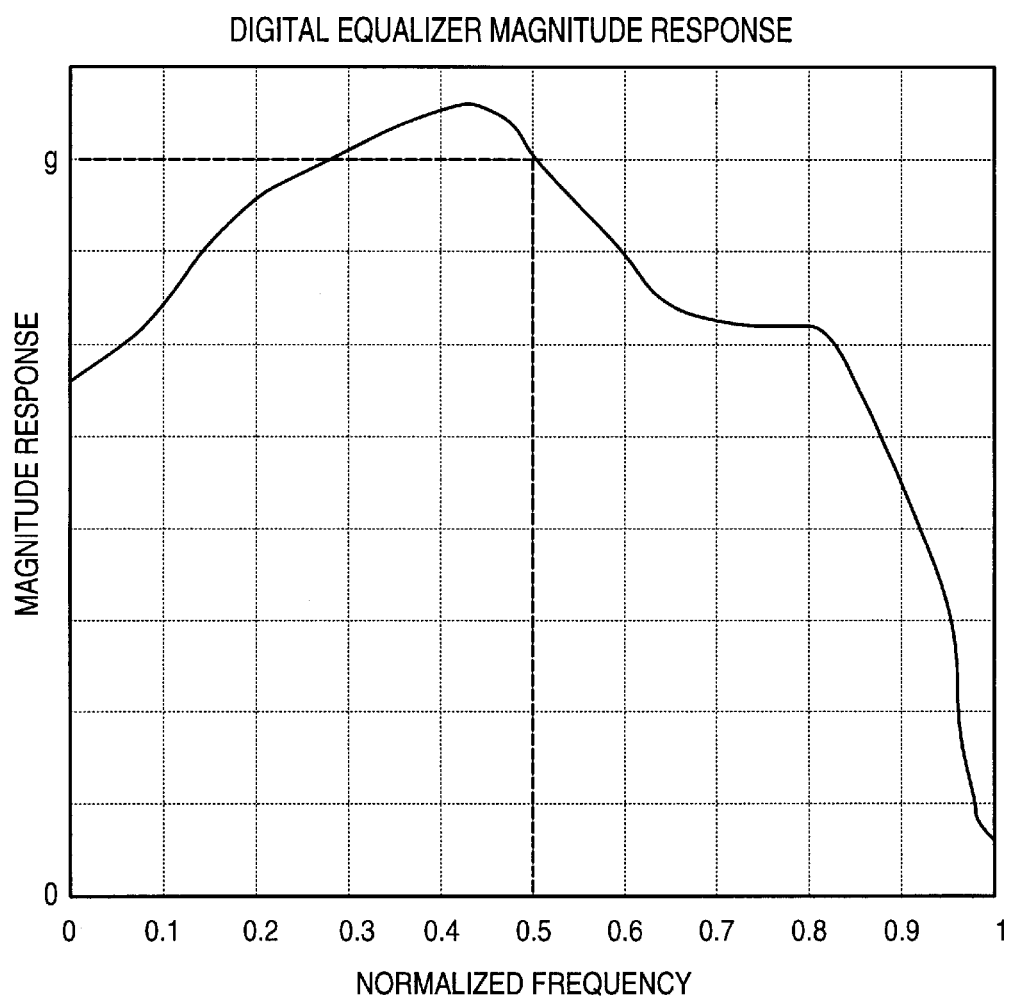
FIG. 8 shows the gain response of the linear equalizer of FIG. 6 constrained to a constant g at the normalized frequency of 1/4T.

Operation of the orthogonal projection operator $Pv_1v_2^\perp$ will now be described in relation to the gain and phase response of the linear equalizer $H_1(z)$ 12. Referring to FIG. 8, the gain (magnitude) response of the linear equalizer $H_1(z)$ 12 has been constrained to a predetermined value (denoted by g) at the normalized frequency of 0.5 (1/4T). Similarly, the phase response of the linear equalizer $H_1(z)$ 12 has been constrained to $k\pi$ at the normalized frequency of 0.5 as shown in FIG. 9. In effect, these constraints allow the gain and phase to vary (adapt) at all frequencies except at the normalized frequency of 0.5, thereby constraining the filter's frequency response in a manner that attenuates interference from the gain and timing loops. In addition, constraining the phase reasponse to $k\pi$ at the normalized frequency of 0.5 results in an integer group delay across frequencies so that the read signal samples $X_k$ 24 can be appropriately synchronized to the error signal $e_k$ 22 as described above. The gain constraint g is relatively arbitrary except that it is selected to optimize the dynamic range of the filter's coefficients. However, constraining the filter's response at the normalized frequency of 0.5 and selecting a phase constraint of $k\pi$ reduces the complexity of the orthogonal projection operator $Pv_1v_2^\perp$.

Turning now to the implementation details of the orthogonal projection operator $Pv_1v_2^\perp$, the equalizer's frequency response is $$C(e^{j2\pi f}) = \sum_k C_k e^{-jk2\pi jT}$$

where $C_k$ are the coefficients of the equalizer's impulse response. At the preamble frequency (1/4T), the equalizer's frequency response is $$C(e^{j\frac{\pi}{2}}) = \sum_k C_k e^{-jk\frac{\pi}{2}}$$

where the sampling period has been normalized to T=1. In matrix form, the equalizer's frequency response at the preamble frequency is, $$C(e^{j\frac{\pi}{2}}) = \underline{C}^T \begin{bmatrix} (e^{j\frac{\pi}{2}})^0 \\ (e^{j\frac{\pi}{2}})^{-1} \\ \vdots \\ (e^{j\frac{\pi}{2}})^{-(N-1)} \end{bmatrix} = \underline{C}^T \begin{bmatrix} (j)^0 \\ (j)^{-1} \\ \vdots \\ (j)^{-(N-1)} \end{bmatrix} = \underline{C}^T \begin{bmatrix} 1 \\ -j \\ -1 \\ j \\ \vdots \end{bmatrix}$$

Those skilled in the art will recognize that shifting the time base will lead to four different, but functionally equivalent, frequency responses at the preamble frequency (i.e., [1,−j,−

1,j, . . . ]$\underline{C}$, [-j,-1,j,1, . . . ]$\underline{C}$, [-1,j,1,-j, . . . ]$\underline{C}$ and [j,1,-j,-1, . . . ]$\underline{C}$). Constraining the phase response of the equalizer to an integer multiple of π at the preamble frequency (1/4T) implies that the imaginary component of its frequency response is zero, $$\underline{C}^T \begin{bmatrix} 0 \\ -1 \\ 0 \\ 1 \\ \vdots \end{bmatrix} = \underline{C}^T \cdot V_1 = 0$$

If the imaginary component of the frequency response is constrained to zero, as described above, then constraining the magnitude of the equalizer to g at the preamble frequency (1/4T) implies that the real component of the frequency response equals g, $$\underline{C}^T \begin{bmatrix} 1 \\ 0 \\ -1 \\ 0 \\ \vdots \end{bmatrix} = \underline{C}^T \cdot V_2 = g$$

Therefore, the equalizer's coefficients $C_k$ must be constrained to satisfy the following two conditions:

$$\underline{C}^T \cdot V_1 = 0 \text{ and } \underline{C}^T \cdot V_2 = g.$$

The above constraints are achieved by multiplying the computed gradient $X_k \cdot e_k$ by an orthogonal projection operation $Pv_1v_2^\perp$ as part of the modified LMS algorithm.

Figure 10:
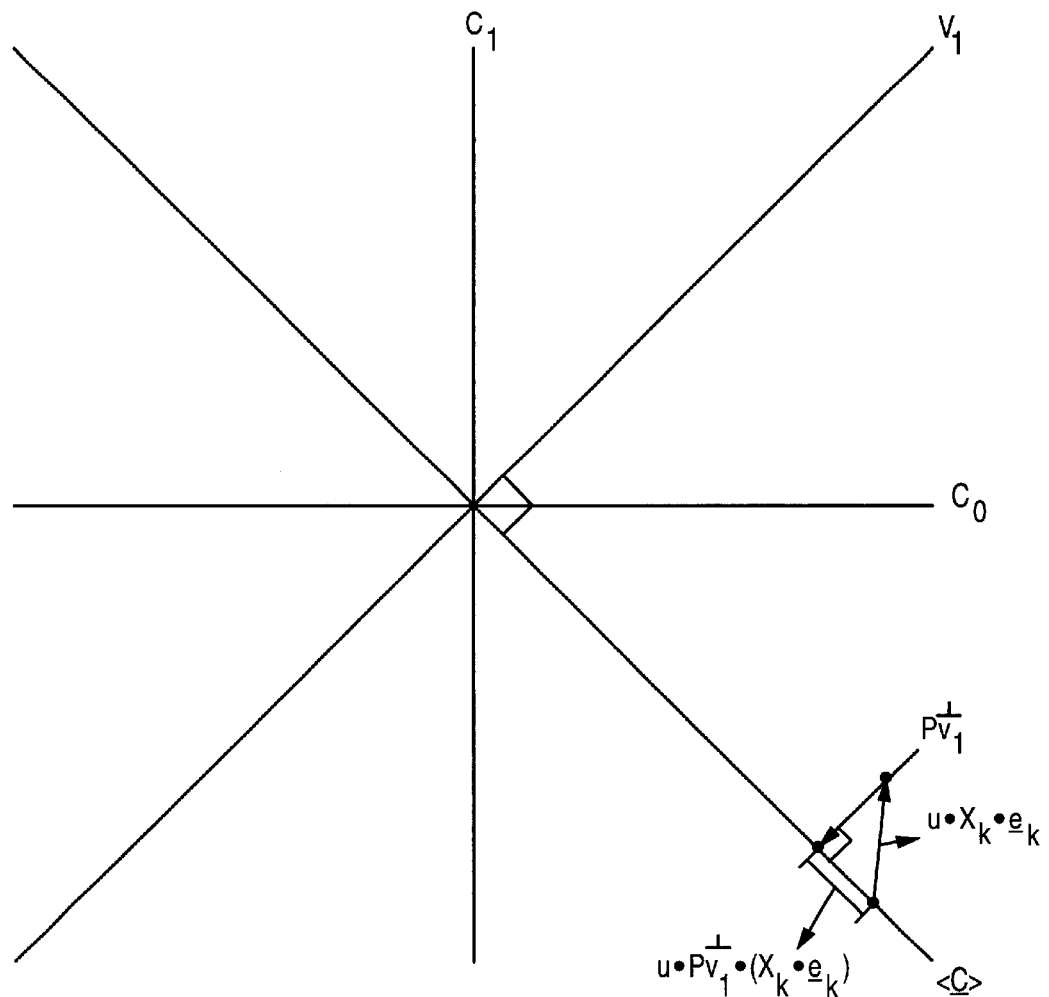
FIG. 10 illustrates operation of the orthogonal projection operation for constraining the gain and phase response of the linear equalizer.
Figure 11:
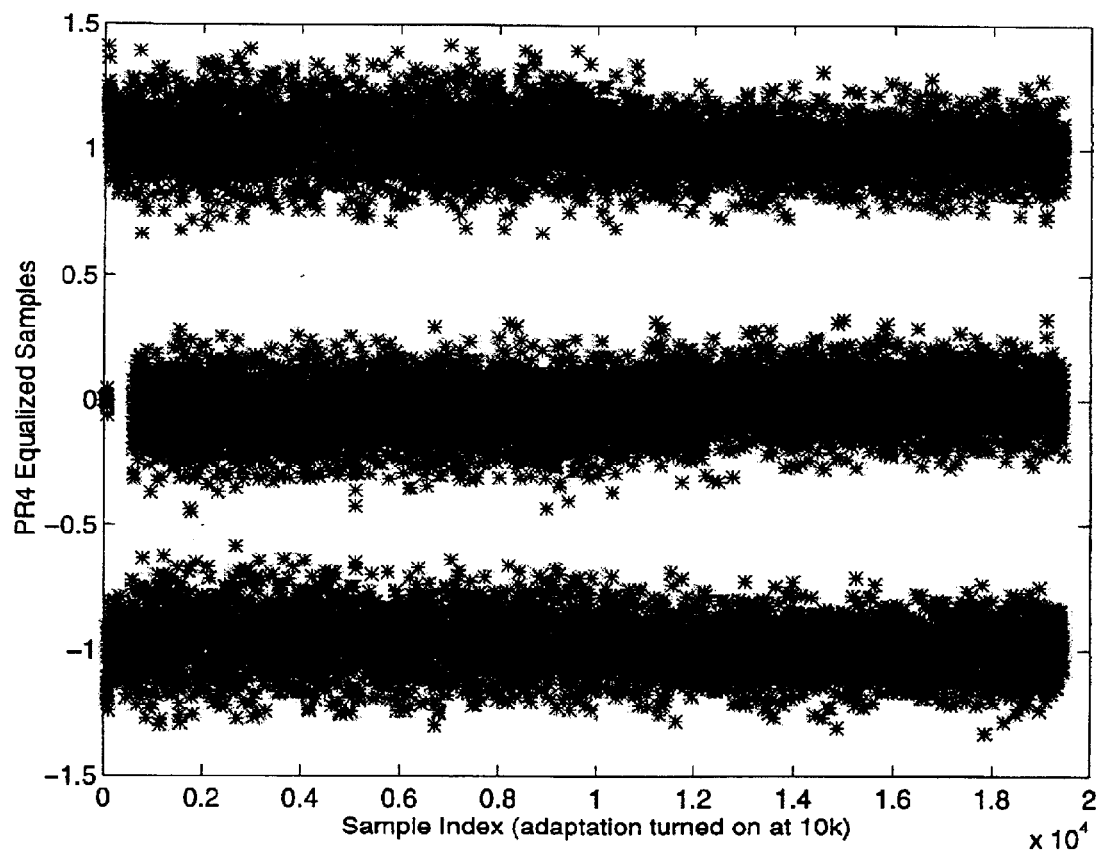
FIG. 11 illustrates the effect of the non-linear correction circuit of the present invention on a PR4 read signal.

To understand the operation of the orthogonal projection operation, consider an equalizer that comprises only two coefficients: $C_0$ and $C_1$ as shown in FIG. 10. The phase constraint condition $\underline{C}^T \cdot V_1 = 0$ implies that the filter coefficient vector $\underline{C}^T$ must be orthogonal to $V_1$. When using an unmodified LMS algorithm to update the filter coefficients, the orthogonal constraint is not always satisfied as shown in FIG. 10. The present invention, however, constrains the filter coefficients to a subspace <$\underline{C}$> which is orthogonal to $V_1$ by multiplying the gradient values $X_k \cdot e_k$ by a projection operation $Pv_1^\perp$, where the null space of the projection operation $Pv_1^\perp$ is orthogonal to <$\underline{C}$>. The updated coefficients correspond to a point on the orthogonal subspace <$\underline{C}$> closest to the coefficients derived from the unmodified LMS algorithm as shown in FIG. 10.

Similar to the phase constraint projection operation $Pv_1^\perp$, a second orthogonal projection operation $Pv_2^\perp$ constrains the filter coefficients such that the coefficient vector $\underline{C}^T$ satisfies the above gain constraint: $\underline{C}^T \cdot V_2 = g$. The combined orthogonal projection operator $Pv_1v_2^\perp$ eliminates two degrees of freedom in an N-dimensional subspace where N is the number of filter coefficients (i.e., the orthogonal projection operator $Pv_1v_2^\perp$ has a rank of N−2).

An orthogonal projection operator for $V_1$ and $V_2$ can be computed according to $$Pv_x^\perp = I - Pv_x = I - V_x(V_x^T V_x)^{-1} V_x^T$$

where $Pv_1v_2^\perp = Pv_1^\perp \cdot Pv_2^\perp$ since $V_1$ is orthogonal to $V_2$. The orthogonal projection operator $Pv_1v_2^\perp$ computed using the above equation for an equalizer comprising ten filter coefficients is a matrix $$Pv_1v_2^\perp = \begin{bmatrix} 4 & 0 & 1 & 0 & -1 & 0 & 1 & 0 & -1 & 0 \\ 0 & 4 & 0 & 1 & 0 & -1 & 0 & 1 & 0 & -1 \\ 1 & 0 & 4 & 0 & 1 & 0 & -1 & 0 & 1 & 0 \\ 0 & 1 & 0 & 4 & 0 & 1 & 0 & -1 & 0 & 1 \\ -1 & 0 & 1 & 0 & 4 & 0 & 1 & 0 & -1 & 0 \\ 0 & -1 & 0 & 1 & 0 & 4 & 0 & 1 & 0 & -1 \\ 1 & 0 & -1 & 0 & 1 & 0 & 4 & 0 & 1 & 0 \\ 0 & 1 & 0 & -1 & 0 & 1 & 0 & 4 & 0 & 1 \\ -1 & 0 & 1 & 0 & -1 & 0 & 1 & 0 & 4 & 0 \\ 0 & -1 & 0 & 1 & 0 & -1 & 0 & 1 & 0 & 4 \end{bmatrix}$$

The above matrix $Pv_1v_2^\perp$ is an orthogonal projection matrix scaled by 5 (multiplied by 5) so that it contains integer valued elements which simplifies multiplying by $X_k \cdot e_k$ in the above LMS update equation. The scaling factor is taken into account in the selection of the gain value μ. Constraining the gain to g and the phase to kπ at the normalized frequency of 0.5 simplifies implementing the orthogonal projection matrix $Pv_1v_2^\perp$: half of the elements are zero and the other half are either +1, −1, or +4. Thus, multiplying the projection matrix $Pv_1v_2^\perp$ by the gradient values $X_k \cdot e_k$ requires only shift registers and adders. In the preferred embodiment, the orthogonal projection operator $Pv_1v_2^\perp$ is actually decimated in order to reduce the cost and complexity of the implementation. For details concerning the decimated embodiment of the orthogonal projection operator $Pv_1v_2^\perp$, see the above referenced co-pending U.S. patent application entitled, "GAIN AND PHASE CONSTRAINED ADAPTIVE EQUALIZING FILTER IN A SAMPLED AMPLITUDE READ CHANNEL FOR MAGNETIC RECORDING."

The objects of the invention have been fully realized through the embodiments disclosed herein. Those skilled in the art will appreciate that the various aspects of the invention can be achieved through different embodiments without departing from the essential function. For example, the aspects of the present invention could be applied to attenuate non-linear distortions in the read signal other than those caused by the non-linear response of an MR read head. The particular embodiments disclosed are illustrative and not meant to limit the scope of the invention as appropriately construed from the following claims.

We claim:

1. A sampled amplitude read channel for reading data recorded on a magnetic disk storage medium by detecting an estimated binary sequence from a sequence of discrete-time sample values generated by sampling an analog read signal emanating from a magneto-resistive (MR) read head positioned over the magnetic disk storage medium, the sampled amplitude read channel comprising:
   (a) an adaptive non-linear correction circuit for correcting a non-linearity in the analog read signal;
   (b) an LMS adaptation circuit, responsive to the discrete-time sample values, for adjusting a parameter of the adaptive non-linear correction circuit; and
   (c) a sequence detector for detecting an estimated binary sequence from the sequence of discrete-time sample values.

2. The sampled amplitude read channel as recited in claim 1, wherein the adaptive non-linear correction circuit comprises an n-th order component of a discrete-time Volterra filter where n is greater than one.

3. The sampled amplitude read channel as recited in claim 2, wherein:
   (a) the component of the Volterra filter is second order (n=2):

$$y_k = \underline{x}_k^T H_2 \underline{x}_k$$

where $\underline{x}_k$ is a vector of the discrete-time sample values, $H_2$ is an nxn matrix of coefficients, and $y_k$ is a discrete-time sample value output by the component of the Volterra filter; and
   (b) the LMS adaptation circuit updates the coefficients in $H_2$ according to:

$$H_2^{(m+1)}(i,j) = H_2^{(m)}(i,j) - \mu e_k x_{k-i} x_{k-j}$$

where $\mu$ is a predetermined gain and $e_k$ is an error value computed relative to a difference between a discrete-time sample value $x_k$ of the read signal and an estimated sample value $\hat{S}_k$ corresponding to the partial response.

4. The sampled amplitude read channel as recited in claim 1, wherein the adaptive non-linear correction circuit is an analog correction circuit.

5. The sampled amplitude read channel as recited in claim 4, wherein the LMS adaptation circuit comprises:
   (a) a squarer for squaring one of the discrete-time sample values to generated a squared sample value;
   (b) a sample value estimator, responsive to the discrete-time sample values, for generating estimated sample values corresponding to the partial response;
   (c) an error generator for generating an error value between the discrete-time sample values and the estimated sample values; and
   (d) a multiplier for multiplying the squared sample value by the error value to generate an update value for use in adjusting the parameter of the adaptive non-linear correction circuit.

6. The sampled amplitude read channel as recited in claim 5, wherein the update value is a LMS update value for a coefficient in a second order component of a Volterra filter.

7. The sampled amplitude read channel as recited in claim 5, wherein the adaptive non-linear correction circuit comprises:
   (a) an analog squaring circuit for squaring the analog read signal to generate a squared analog signal; and
   (b) a multiplier for multiplying the squared analog signal by a coefficient, wherein the coefficient is adjusted in response to the update value.

8. The sampled amplitude read channel as recited in claim 7, wherein the adaptive non-linear correction circuit further comprises:
   (a) an adder for adding the analog read signal to the squared analog read signal to generate a corrected analog read signal;
   (b) a comparator for comparing the analog read signal to a threshold; and
   (c) a multiplexer for selecting between the analog read signal and the corrected analog read signal in response to the comparator.

9. The sampled amplitude read channel as recited in claim 5, further comprising:
   (a) a linear discrete-time equalizer for equalizing the discrete-time sample values according to a desired partial response; and
   (b) a constraint circuit for constraining a phase response of the linear discrete-time equalizer at a predetermined frequency.

10. The sampled amplitude read channel as recited in claim 9, wherein the constraint circuit implements an orthogonal projection operation.

11. The sampled amplitude read channel as recited in claim 9, wherein the predetermined frequency is a frequency near the maximum amplitude of the partial response spectrum.

12. The sampled amplitude read channel as recited in claim 9, wherein the predetermined frequency is substantially 1/4T where T is a baud rate period of the data recorded on the magnetic disk storage medium.

13. A sampled amplitude read channel for reading data recorded on a magnetic disk storage medium by detecting an estimated binary sequence from a sequence of discrete-time sample values generated by sampling an analog read signal emanating from a read head positioned over the magnetic disk storage medium, the sampled amplitude read channel comprising:
   (a) a sampling device for sampling the analog read signal to generate the sequence of discrete-time sample values;
   (b) a discrete-time Volterra equalizer comprising:
      (i) a discrete-time linear filter for equalizing the discrete-time sample values according to a desired partial response; and
      (ii) a discrete-time non-linear filter for attenuating a non-linearity in the discrete-time sample values;
   (c) an LMS adaptation circuit, responsive to the discrete-time sample values, for adjusting coefficients of the linear and non-linear filters; and
   (d) a sequence detector for detecting an estimated binary sequence from the sequence of discrete-time sample values output by the discrete-time Volterra equalizer.

14. The sampled amplitude read channel as recited in claim 13, wherein:
   (a) the non-linear filter outputs sample values $y_k$ according to:

$$y_k = \underline{x}_k^T H_2 \underline{x}_k$$

where $\underline{x}_k$ is a vector of the discrete-time sample values, $H_2$ is an nxn matrix of coefficients; and
   (b) the LMS adaptation circuit updates the coefficients in $H_2$ according to:

$$H_2^{(m+1)}(i,j) = H_2^{(m)}(i,j) - \mu e_k x_{k-i} x_{k-j}$$

where $\mu$ is a predetermined gain and $e_k$ is an error value computed relative to a difference between a discrete-time sample value $x_k$ of the read signal and an estimated sample value $\hat{S}_k$ corresponding to the partial response.

15. A sampled amplitude read channel for reading data recorded on a magnetic disk storage medium by detecting an estimated binary sequence from a sequence of discrete-time sample values generated by sampling an analog read signal emanating from a magneto-resistive (MR) read head positioned over the magnetic disk storage medium, the sampled amplitude read channel comprising:
   (a) an adaptive non-linear analog correction circuit for correcting a non-linearity in the analog read signal;
   (b) a discrete-time linear equalizer for equalizing the discrete-time sample values according to a desired partial response;
   (c) an LMS adaptation circuit, responsive to the discrete-time sample values input into the discrete-time linear equalizer, for adjusting a parameter of the adaptive non-linear correction circuit; and (d) a sequence detector for detecting an estimated binary sequence from the sequence of discrete-time sample values.

16. The sampled amplitude read channel as recited in claim 15, wherein the LMS adaptation circuit comprises:
   (a) a squarer for squaring one of the discrete-time sample values to generated a squared sample value;
   (b) a sample value estimator, responsive to the discrete-time sample values output by the linear equalizer, for generating estimated sample values corresponding to the partial response;
   (c) an error generator for generating an error value between the discrete-time sample values and the estimated sample values; and
   (d) a multiplier for multiplying the squared sample value by the error value to generate an update value for use in adjusting the parameter of the adaptive non-linear analog correction circuit.

17. The sampled amplitude read channel as recited in claim 16, wherein the update value is a LMS update value for a coefficient in a second order component of a Volterra filter.

18. The sampled amplitude read channel as recited in claim 16, wherein the adaptive non-linear analog correction circuit comprises:
   (a) an analog squaring circuit for squaring the analog read signal to generate a squared analog signal; and
   (b) a multiplier for multiplying the squared analog signal by a coefficient, wherein the coefficient is adjusted in response to the update value.

19. The sampled amplitude read channel as recited in claim 18, wherein the adaptive non-linear analog correction circuit further comprises:
   (a) an adder for adding the analog read signal to the squared analog read signal to generate a corrected analog read signal;
   (b) a comparator for comparing the analog read signal to a threshold; and
   (c) a multiplexer for selecting between the analog read signal and the corrected analog read signal in response to the comparator.

20. The sampled amplitude read channel as recited in claim 16, further comprising a constraint circuit for constraining a phase response of the linear discrete-time equalizer at a predetermined frequency.

21. The sampled amplitude read channel as recited in claim 20, wherein the constraint circuit implements an orthogonal projection operation.

22. The sampled amplitude read channel as recited in claim 20, wherein the predetermined frequency is a frequency near the maximum amplitude of the partial response spectrum.

23. The sampled amplitude read channel as recited in claim 20, wherein the predetermined frequency is substantially 1/4T where T is a baud rate period of the data recorded on the magnetic disk storage medium.

24. A sampled amplitude read channel for reading data recorded on a magnetic disk storage medium by detecting an estimated binary sequence from a sequence of discrete-time sample values generated by sampling an analog read signal emanating from a read head positioned over the magnetic disk storage medium, the sampled amplitude read channel comprising:
   (a) an adaptive non-linear correction circuit for correcting a non-linearity in the analog read signal, comprising:
      (i) a n-th order polynomial circuit, responsive to the analog read signal, for generating a corrected analog read signal;
      (ii) a comparator for comparing the analog read signal to a threshold; and
      (iii) a multiplexer for selecting between a first analog signal and the corrected analog read signal in response to the comparator;
   (b) an adaptation circuit, responsive to the discrete-time sample values, for adjusting a coefficient of the n-th order polynomial circuit; and
   (c) a sequence detector for detecting the estimated binary sequence from the sequence of discrete-time sample values.

25. The sampled amplitude read channel as recited in claim 24, wherein n=2 in the n-th order polynomial circuit.

26. The sampled amplitude read channel as recited in claim 24, wherein the threshold is zero.

* * * * *